United States Patent
Murthy

(10) Patent No.: US 9,043,921 B2
(45) Date of Patent: May 26, 2015

(54) DETERMINING SOFTWARE METRICS

(71) Applicant: FUJITSU LIMITED, Kawasaki-shi, Kanagawa (JP)

(72) Inventor: Praveen K. Murthy, Fremont, CA (US)

(73) Assignee: FUJITSU LIMITED, Kawasaki (JP)

( * ) Notice: Subject to any disclaimer, the term of this patent is extended or adjusted under 35 U.S.C. 154(b) by 90 days.

(21) Appl. No.: 13/862,234

(22) Filed: Apr. 12, 2013

(65) Prior Publication Data

US 2014/0310813 A1    Oct. 16, 2014

(51) Int. Cl.
  *G06F 11/00*   (2006.01)
  *G06F 21/57*   (2013.01)
  *G06F 11/36*   (2006.01)

(52) U.S. Cl.
  CPC ............ *G06F 21/57* (2013.01); *G06F 11/3676* (2013.01); *G06F 11/3644* (2013.01)

(58) Field of Classification Search
  CPC ....... G06F 21/577; G06F 21/56; G06F 8/433; G06F 21/00
  USPC .......................................................... 726/25
  See application file for complete search history.

(56) References Cited

U.S. PATENT DOCUMENTS 6,665,866 B1 * 12/2003 Kwiatkowski et al. ....... 717/159
7,299,497 B2   11/2007 Howard
2004/0103402 A1 * 5/2004 Bera ............................. 717/132
2013/0055210 A1   2/2013 Murthy et al.
2013/0055220 A1   2/2013 Murthy
2013/0055221 A1   2/2013 Murthy et al.

OTHER PUBLICATIONS

P. K. Manadhata, "An Attack Surface Metric" IEEE Transactions on Software Engineering, vol. XX, No. X, Month 2010, pp. 1-17.
M. Howard et al. "Measuring Relative Attack Surfaces" Computer Security in the 21st Century, 2005, pp. 1-15.
P. K. Mandadhata et al. "Measuring the Attack Surfaces of SAP Business Applications" School of Computer Science, May 2008, pp. 1-23.

\* cited by examiner

*Primary Examiner* — Dant Shaifer Harriman
*Assistant Examiner* — Abiy Getachew
(74) *Attorney, Agent, or Firm* — Maschoff Brennan

(57) ABSTRACT

A method of determining a metric of software code may include generating a flow graph for software code that includes multiple flow graph nodes, including an entry point node, a termination point node, and a metric node. The method may also include generating a contracted flow graph based on the flow graph that includes multiple contracted flow graph nodes. The method may further include determining a through path count within the contracted flow graph based on the contracted flow graph nodes between a first contracted flow graph node that includes the entry point node and a second contracted flow graph node that includes the termination point node. The method may also include determining a metric entry path count within the contracted flow graph based on the contracted flow graph nodes between the first contracted flow graph node and a third contracted flow graph node that includes the metric node.

20 Claims, 5 Drawing Sheets

DETERMINING SOFTWARE METRICS

FIELD

The embodiments discussed herein are related to determining software metrics based on path analysis.

BACKGROUND

In the computer industry, it is well known that computer software and networks may be attacked, for example, by hackers. In particular, hackers may breach the security features of a computer product, thereby obtaining access to trade secret and personal information that is stored therein. Upon breaching the security features of a computer product, hackers may alter programming and destroy valuable computing resources that are associated with the computer product.

In order to prevent some of the foregoing problems, the computer industry has continually attempted to secure known vulnerabilities and to develop new robust and secure computer products that are less likely to be attacked than the preceding products. However, despite efforts to overcome known security deficiencies and to develop more secure products, the computer industry has yet to develop a method for determining the relative vulnerability of a computer product to attack.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of determining a metric of software code may include generating a flow graph for software code. The flow graph may include multiple flow graph nodes. The multiple flow graph nodes may include an entry point node, a termination point node, and a metric node. The metric node may include a metric object of the software code. The method may also include generating a contracted flow graph based on the flow graph that includes multiple contracted flow graph nodes. At least one of the contracted flow graph nodes may represent a clustered subset of the flow graph nodes. The method may further include determining a through path count within the contracted flow graph based on the contracted flow graph nodes between a first contracted flow graph node that includes the entry point node and a second contracted flow graph node that includes the termination point node. The method may also include determining a metric entry path count within the contracted flow graph based on the contracted flow graph nodes between the first contracted flow graph node and a third contracted flow graph node that includes the metric node.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1A:
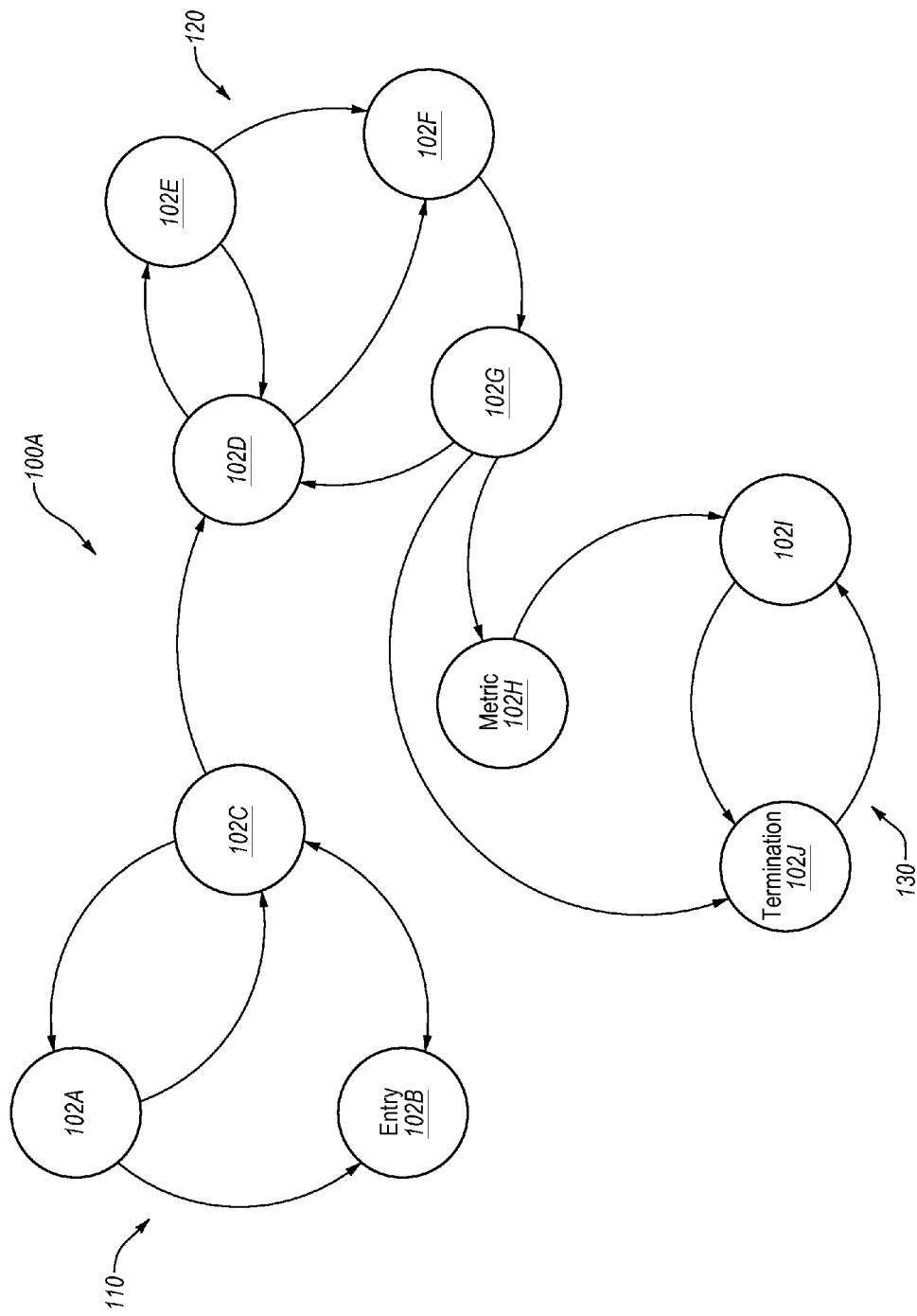
FIG. 1A illustrates an example flow graph for software code.

Some embodiments described herein relate to determining metrics of software code of a software program. Determining metrics of the software code may include measuring a property of the software code. The properties or metrics of the software code that may be measured or determined may relate to the security of the software code, network performance of the software code, disk access performance of the software code, user interactions with the software code, among others.

The metrics of the software code may be determined by analyzing a flow graph representation of the software code. The nodes within the flow graph of the software code that are associated with entry points into the software code, such as a user interface or API, termination points in the software code, and/or metric objects of the software code may be identified. A metric object of the software code may vary based on the metric of the software being determined. For example, when the metric of the software code relates to security of the software code, a metric object of the software code may be a sensitive function, method, or object within the software code, such as a function or a method that sets user permissions, accesses a database, writes to a disk, deals with protected information, among others.

By analyzing the flow graph of the software code, a number of paths between any two nodes in the flow graph may be determined. For example, a number of metric entry paths in the flow graph between the nodes associated with the entry points and the nodes associated with the metric objects may be determined. Alternately or additionally, a number of metric termination paths in the flow graph between the nodes associated with the termination points and the nodes associated with the metric objects and a number of through paths in the flow graph between the nodes associated with the entry points and the nodes associated with the termination points may also be determined. A metric for the software code may be based on ratios or other comparisons between the number of metric entry paths, the number of metric termination paths, and the number of through paths.

In some embodiments, the flow graph of the software code may have a large or infinite number of paths between the nodes in the flow graph due to the configuration of the nodes and the connections, also referred to as edges, there between. In some circumstances, the paths between the nodes in the flow graph may be difficult or impossible to analyze because of their large numbers. In these and other embodiments, a contracted flow graph may be generated based on the flow graph. To generate the contracted flow graph, a subset of the nodes within the flow graph that are strongly connected may be clustered to form a cluster contracted flow graph node in the contracted flow graph. In some embodiments, the contracted flow graph may be a directed acyclic graph based on the flow graph. The number of metric entry paths, metric termination paths, and through paths may be determined based on the contracted flow graph. In some embodiments, a number of paths between two nodes in the contracted flow graph may be weighted based on the contracted flow graph nodes between the two nodes that include a subset of strongly connected nodes of the flow graph.

Embodiments of the present invention will be explained with reference to the accompanying drawings.

FIG. 1A illustrates an example flow graph 100A for software code, arranged in accordance with at least some embodiments described herein. The flow graph 100A may be configured to represent different execution paths through the software code. In general, in some embodiments, a flow graph, like the flow graph 100A, may be part of a process in determining a metric of the software code as described herein. The flow graph 100A is an example flow graph that is simplistic and provided for explanatory and illustrative purposes. Modifications, additions, or omissions may be made to the flow graph 100A without departing from the scope of the present disclosure.

In some embodiments, the software code may be generated using one of the following programming languages Perl, C, C++, C#, Java, JavaScript, Python, Ruby, assembly language, Fortran, common business-oriented language (COBOL), structured query language (SQL), hypertext preprocessor (PHP), extensible markup language (XML), hypertext markup language (HMTL), among others.

The flow graph 100A may include nodes 102A, 102B, 102C, 102D, 102E, 102F, 102G, 102H, 102I, and 102J (collectively referred to herein as "the nodes 102") that are connected together by edges that are depicted as lines with arrows in FIG. 1A. The nodes 102 in the flow graph 100A may each correspond to a different operation within the software code, such as a function or method; other operations, such as, while statements, if statements, let statements, case statements, among other types of code statements; operators such as, =, +, *, −, &, %; among other operations. In some embodiments, the nodes 102 may represent multiple operations that do not result in the software code moving to a different portion of the software code or the software code executing a conditional statement that results in the software code executing different portions of the software code. In these and other embodiments, an edge in the flow graph 100A may correspond to the software code moving to different portions within the software code or the execution of a conditional statement within the software code. In general, movement between the nodes 102 in the flow graph 100A may be referred to as a flow of the software code.

For example, the software code may flow from an operation corresponding to the node 102A, to an operation corresponding to the node 102C, to an operation corresponding to the node 102B, and back to the operation corresponding to the node 102C. As another example, the software code may be executing a first function that corresponds to the node 102A. The software code may then call a second function, and begin executing the second function, which corresponds to the node 102C. After, the software code may call a third function and begin executing the third function, which corresponds to the node 102B, and then return to the second function that corresponds to the node 102C. These examples illustrate how the edges and the nodes 102 within the flow graph 100A may represent execution paths in the software code.

In some embodiments, a number of different execution paths (referred to here after as "paths") between any two of the nodes 102 within the flow graph 100A may be determined. A path in a flow graph may be considered different when the path includes different nodes and/or a different sequence of nodes. For example, various paths between the nodes 102A and 102D may include a first path that may start at the node 102A, flow to the node 102C, and then flow to the node 102D; a second path that may start at the node 102A, flow to the node 102C, flow to the node 102B, flow back to the node 102C, and then flow to the node 102D; a third path that may start at the node 102A, flow to the node 102B, flow to the node 102C, and then flow to the node 102D; a fourth path that may start at the node 102A, flow to the node 102B, flow to the node 102C, flow to the node 102A, flow to the node 102C, flow to the node 102A, flow to the node 102B, flow to the node 102C, and then flow to the node 102D. In the flow graph 100A, there are an infinite number of paths between the nodes 102A and 102D because of the configuration of the edges between the nodes 102A, 102B, 102C, and 102D. As a result, counting the paths between the nodes 102A and 102D and other analogously configured nodes in the flow graph 100A may be difficult.

Because it may be difficult to count a number of paths between some of the nodes 102 in the flow graph 100A, various subsets of the nodes 102 may be clustered to form clusters of nodes, such as clusters 110, 120, and 130. In some embodiments, the clusters 110, 120, and 130 may be formed based on the nodes 102 in the flow graph 100A that are strongly connected. Nodes in a cluster may be considered strongly connected when there is a path from each node in the cluster to every other node in the cluster. For example, the cluster 110 may include the nodes 102A, 102B, and 102C, the cluster 120 may include the nodes 102D, 120E, 102F, and 102G, and the cluster 130 may include the nodes 102I and 102J.

In some embodiments, each of the clusters 110, 120, 130 may be represented in a contracted flow graph as a single contracted flow graph node. The contracted flow graph nodes in the contracted flow graph that represent a cluster of nodes from a flow graph, such as the clusters 110, 120, and 130 of FIG. 1A, may be referred to herein as cluster contracted flow graph nodes.

Figure 1B:
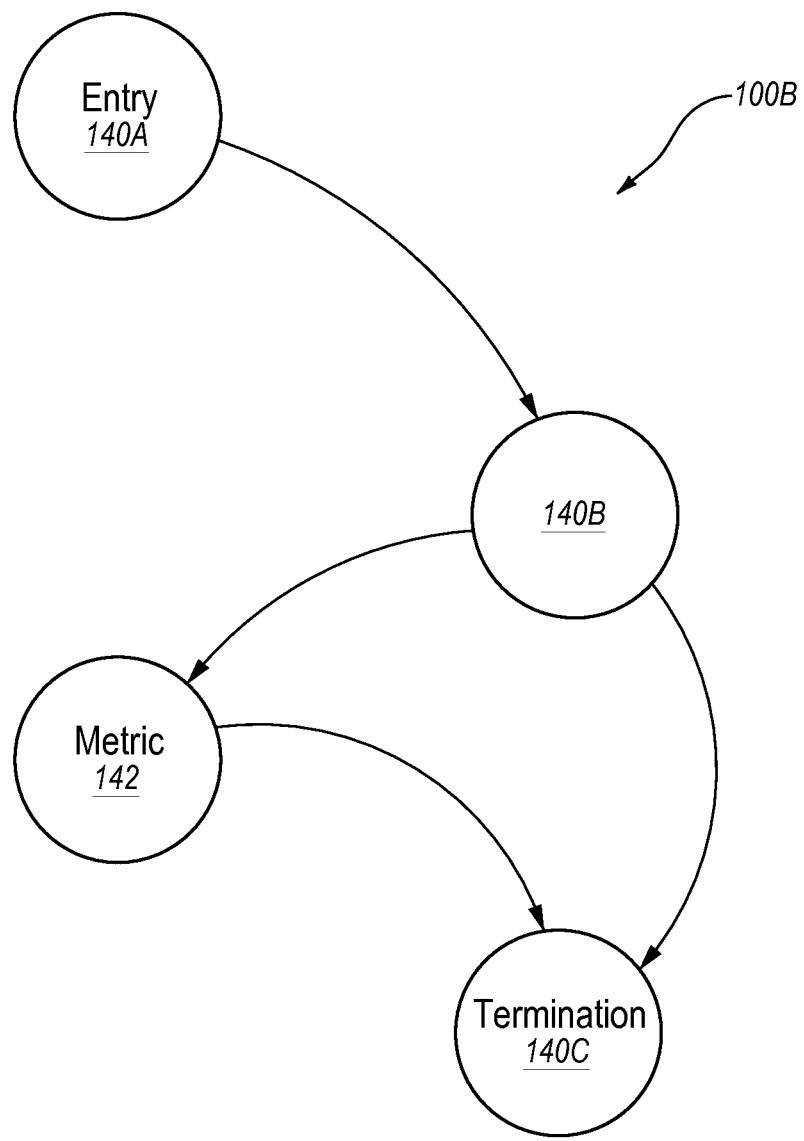
FIG. 1B illustrates an example contracted flow graph of the flow graph of FIG. 1A.

FIG. 1B illustrates an example contracted flow graph 100B of the flow graph 100A of FIG. 1A, arranged in accordance with at least some embodiments described herein. The contracted flow graph 100B includes multiple contracted flow graph nodes. The contracted flow graph nodes within the contracted flow graph 100B include contracted flow graph node 142, which is similar to the node 102H, and cluster contracted flow graph nodes 140A, 140B, and 140C (referred to herein as the cluster contracted flow graph nodes 140), which each represent a subset of the nodes 102 from FIG. 1A. In particular, the cluster contracted flow graph node 140A may represent the cluster 110 (the nodes 102A, 102B, and 102C) of FIG. 1A. The cluster contracted flow graph node 140B may represent the cluster 120 (the nodes 102D, 102E, 102F, and 102G) of FIG. 1A and the cluster contracted flow graph node 140C may represent the cluster 130 ((the nodes 102I and 102J) of FIG. 1A. In general, a contracted flow graph includes contracted flow graph nodes. The contracted flow graph nodes may be contracted flow graph nodes that represent a single flow graph node or a clustered subset of flow graph nodes. The contracted flow graph nodes that include a clustered subset of flow graph nodes may be referred to herein as a cluster contracted flow graph nodes. However, it should be understand that cluster contracted flow graph nodes are just a type of contracted flow graph node. As such, the use of the term contracted flow graph node may generally refer to any contracted flow graph node within a contracted flow graph, whether the contracted flow graph node represents a single flow graph node or a clustered subset of flow graph nodes.

In some embodiments, a number of different paths between any two of the cluster contracted flow graph nodes 140 and/or the contracted flow graph node 142 within the contracted flow graph 100B may be determined. For example, there are two different paths between the cluster contracted flow graph nodes 140A and 140C. A first path between the cluster contracted flow graph nodes 140A and 140C may start at the cluster contracted flow graph node 140A, flow to the cluster contracted flow graph node 140B, and then flow to the cluster contracted flow graph node 140C. A second path between the cluster contracted flow graph nodes 140A and 140C may start at the cluster contracted flow graph node 140A, flow to the cluster contracted flow graph node 140B, flow to the contracted flow graph node 142, and then flow to the cluster contracted flow graph node 140C. In some embodiments, the contracted flow graph 100B may be a direct acyclic graph or some other type of graph. With the contracted flow graph 100B being a direct acyclic graph, the number of paths between two nodes in the contracted flow graph 100B are finite.

The contracted flow graph 100B allows for the number of paths between two nodes in the contracted flow graph 100B to be more easily determined than the number of paths between nodes in the flow graph 100A because the number of paths in the contracted flow graph 100B are finite. In some embodiments, because some of the contracted flow graph nodes within the contracted flow graph 100B are cluster contracted flow graph nodes, the contracted flow graph 100B may provide path counts between two nodes that do not provide an adequate representation of the actual paths that may be followed between the two nodes by the software code represented by the contracted flow graph 100B. For example, the number of paths between the cluster contracted flow graph node 140A and the contracted flow graph node 142 may be determined to be one based on the contracted flow graph 100B. However, the number of paths that may be followed between the cluster contracted flow graph node 140A and the contracted flow graph node 142 by the software code may be much larger based on the paths followed by the software code between the nodes 102 of the flow graph 102A (e.g., the nodes 102D, 102E, 102F, and 102G) within the cluster contracted flow graph node 140A.

To provide a more adequate representation of paths that may be followed in the software program, the cluster contracted flow graph nodes 140 may each be given a weighted path value. A weighted path value for a cluster contracted flow graph node may be applied to the number of paths determined between two nodes that include the cluster contracted flow graph node. For example, the cluster contracted flow graph node 140B may be assigned a weighted path value of 10, indicating that a single path between two nodes that includes the cluster contracted flow graph node 140B may represent 10 different paths between the two nodes. As explained above, without applying a weighted path value to the cluster, the number of paths between the cluster contracted flow graph nodes 140A and 140C may be two. When the weighted path value is assigned to the cluster contracted flow graph node 140B, the number of paths that pass through the cluster contracted flow graph node 140B may be multiplied by 10 to determine the total number of paths. Thus, the total number of paths between the cluster contracted flow graph nodes 140A and 140C may be 20 paths based on the two paths through the cluster contracted flow graph node 140B being multiplied by the weighted path value of 10.

The weighted path value for a cluster contracted flow graph node may be determined using multiple different methods or combination of methods. For example, in some embodiments, the weighted path value for a cluster contracted flow graph node may be based on the diameter of the cluster contracted flow graph node. In some embodiments, the diameter of the cluster contracted flow graph node may be approximately equal to the largest number of edges between two nodes in the cluster contracted flow graph node. In some embodiments, the weighted path value for a cluster contracted flow graph node may be based on the number of paths that do not repeat a node within the cluster contracted flow graph node. For example, the number of paths within the cluster 130 of FIG. 1A, which is represented by the cluster contracted flow graph node 140C of FIG. 1B, that does not repeat a node is two.

In some embodiments, the weighted path value for a cluster contracted flow graph node may be based on a determination of entry and exit nodes within the cluster contracted flow graph node. An entry or exit node may be a node that has an edge with a node outside the cluster contracted flow graph node. In particular, for a path between two nodes in the contracted flow graph 100B, an entry node may be a node through which the path enters the cluster contracted flow graph node and an exit node may be a node through which the path exits the cluster contracted flow graph node. For each pair of entry and exit nodes within a cluster contracted flow graph node, a number of paths between a pair of entry and exit nodes that pass through less than or equal to a total number of nodes in the cluster contracted flow graph node may be determined. The total number of paths for each of the pairs of entry and exit nodes may be added together to determine the weighted path value of the cluster contracted flow graph node. For example, for the cluster 120 in FIG. 1A, which is represented by the cluster contracted flow graph node 140B in FIG. 1B, the node 102D may be the entry node and the node 102G may be the exit node. With four nodes in the cluster, paths that include four or less nodes may be considered. These paths may include a first path that starts from the node 102D, flows to the node 102F, and flows to the node 102G and a second path that starts from the node 102D, flows to the node 102E, flows to the node 102F, and flows to the node 102G. Thus, the weighted path value for the cluster contracted flow graph node 140B may be two.

In some embodiments, the weighted path value for a cluster contracted flow graph node may be determined using other methods than those described herein. Alternately or additionally, the weighted path value for a cluster contracted flow graph node may be determined using a combination of one or more different methods. For example, the weighted path value for each of a subset of different methods may be combined in some fashion, such as by using the mean, median, weighted mean, or some other combination of the weighted path values for the different methods. Alternately or additionally, a weighted path value for a cluster contracted flow graph node may be one. In some embodiments, each of the cluster contracted flow graph nodes 140 may have a weighted path value determined therefor based on a similar or analogous method or combination of methods or using different methods or different combination of methods.

In some embodiments, an entry node for a path and/or a termination node for a path within the contracted flow graph 100B may be a particular node within one of the cluster contracted flow graph nodes 140. For example, the entry node may be the node 102A of FIG. 1A within the cluster contracted flow graph node 140A. In these and other embodiments, the paths through the cluster contracted flow graph nodes 140 that include the entry node and termination node, respectively, may be considered, or one may be considered, when determining a number of paths between the entry node and the termination node. For example, assume an entry node within the cluster contracted flow graph node 140A and a termination node within the cluster contracted flow graph node 140C. The weighted path value for the cluster contracted flow graph node 140A may be two, the weighted path value for the cluster contracted flow graph node 140C may be two, and the weighted path value for the cluster contracted flow graph node 140B may be three. As noted earlier, there are two paths between the cluster contracted flow graph node 140A and the cluster contracted flow graph node 140C when no weighted path values are assumed. With the weighted path values for the cluster contracted flow graph nodes 140 as mentioned previously, the number of paths between the entry and termination node may be 2 (number of paths with no weights)*2 (weighted path value of cluster contracted flow graph node 140A)*3 (weighted path value of cluster contracted flow graph node 140B)*2 (weighted path value of cluster contracted flow graph node 140C)=24 paths.

Referring again to FIG. 1A, in some embodiments, the software code may include an entry operation that may be represented by the node 102B. An entry operation may be any operation in the software code that allows a person or an outside system to interact with the software code. Interactions with the software code may include receiving data, sending data, and/or displaying data using a user interface, an API interface, or some other interface. In some embodiments, the entry operation may be specific to a metric being determined for the software code. For example, when the metric relates to network-access, the entry operation may be an operation in the software code that begins network access.

In some embodiments, the software code may also include a termination operation that may be represented by the node 102J. A termination operation may be any operation in the software code that terminates, ends, suspends, or otherwise stops the execution of the software code until the software code is reset or executing again. For example, termination operations may include thrown exceptions, end of code, among other termination or exit points. In some embodiments, the termination operation may be specific to a metric being determined for the software code. For example, when the metric relates to disk-access, the termination operation may be an operation in the software code that terminates disk access.

In some embodiments, the software code may also include a metric object that may be represented by the node 102H. A metric object may be any object in the software code, such as a variable, function, method, or operation. The metric object may be selected based on the metric being determined for the software code. For example, when the metric is security of the software code, the metric object may be an operation associated with security of the software code, such as user permissions, accesses to a database, writing to a disk, protected information, among others. As another example, when the metric relates to compute time, the metric object may be an operation that uses multiple computations or is computationally intensive, such as a function to determine prime numbers or compute on large numbers of large objects.

In some embodiments, when determining a metric of the software code, the number of through paths between each pair of the entry operations and termination operations for the metric may be determined. A number of metric entry paths between each pair of the entry operations and the metric objects for the metric may also be determined. Alternately or additionally, a number of metric termination paths between each pair of the termination operations and the metric objects for the metric may be determined.

The metric of the software code may be determined based on ratios and/or other comparisons between the number of through paths, metric entry paths, and/or metric termination paths. For example, in some embodiments, the metric of the software code may be the ratio of the number of metric entry paths and the number of through paths. Alternately or additionally, the metric of the software code may be combination of ratios or other comparisons between the number of metric entry paths, through paths, and/or metric termination paths. Alternately or additionally, the metric of the software code may be the number of metric entry paths, through paths, and/or metric termination paths.

After a metric is determined, changes may be made to the software code. The metric, and thus the ratio associated with the metric, may be referred to as a first metric. A second metric, which uses the same metric node within the software code as the first metric, may be determined to better understand how the changes to the software code affect the software code and in particular the metric node of the software code. For example, in some embodiments, a first metric determined for the software code may relate to security and may be a ratio between through paths and metric entry paths for the metric node that is 20 to 1. The software code may undergo certain changes, such as the addition of an API. A second metric also related to security may be determined for the metric node of the software code and may be determined to be 35 to 1. The change between the first and second security metrics may indicate that the changes to the software code led to the software code, and in some embodiments, the metric node of the software code, being less vulnerable to security threats, such as attacks from hackers and/or malware because there are more through paths than metric entry paths.

As another example, a metric determined for the software code may relate to network-access. A network-access metric for similar software code may also be determined. The metric for the software code and the metric for the similar software code may be used to compare the network-access capabilities of the software code with the network-access capabilities of the similar software code. In short, a metric determined for software code as described herein may provide a manner for quantitatively tracking changes to the software code or for quantitatively comparing the software code to other software codes or other versions of the software code.

Figure 2:
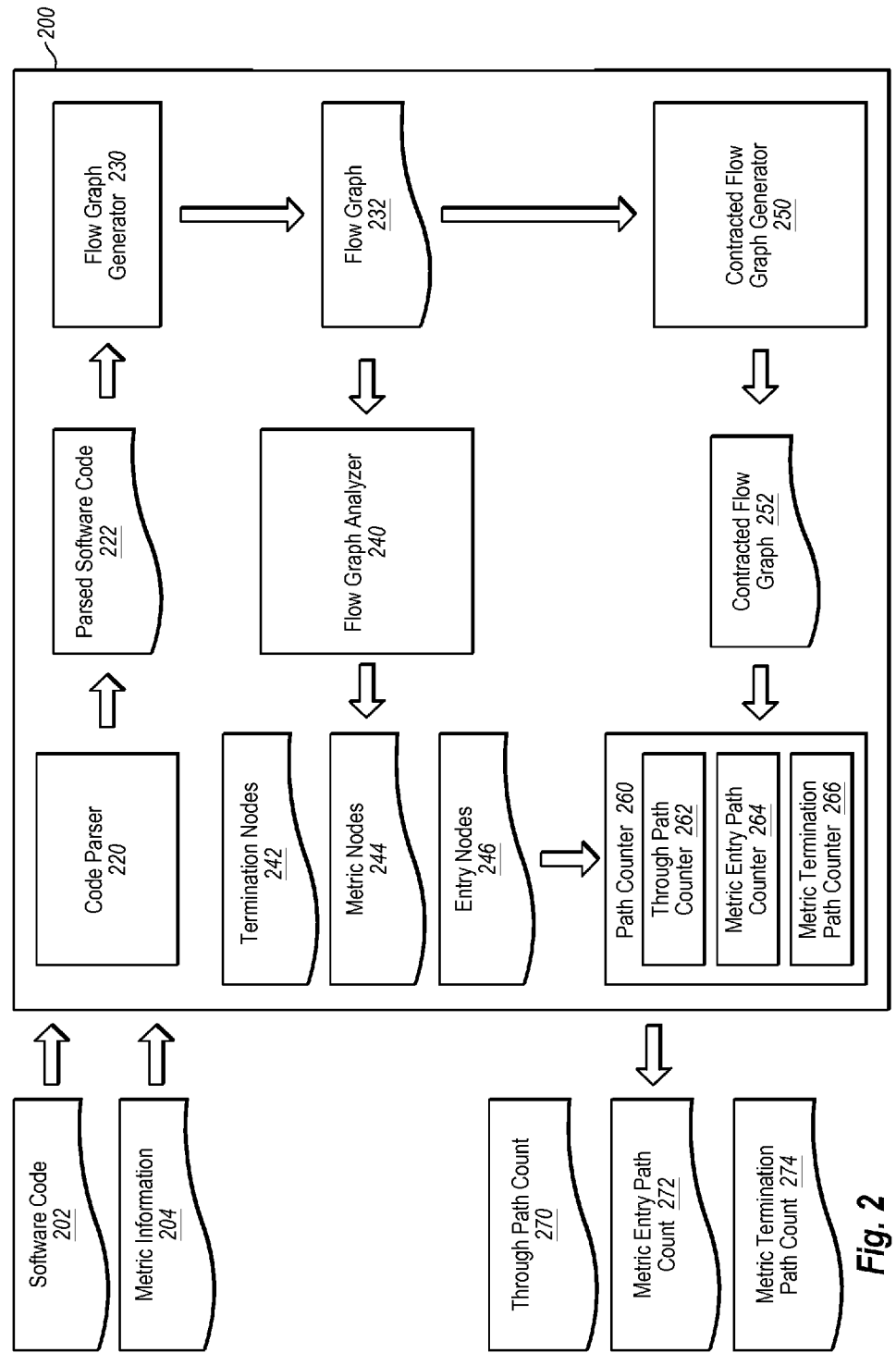
FIG. 2 is block diagram of an example system for determining a metric of software code.

FIG. 2 is block diagram of an example system 200 for determining a metric of software code, arranged in accordance with at least some embodiments described herein. In particular, the system 200 may be configured to count through paths, metric entry paths, and metric termination paths, for software code 202. The system 200 may include a code parser 220, a flow graph generator 230, a flow graph analyzer 240, a contracted flow graph generator 250, and a path counter 260. The path counter 260 may include a through path counter 262, a metric entry path counter 264, and a metric termination path counter 266.

The code parser 220 may be configured to receive the software code 202. The software code 202 may be generated using one of the following programming languages Perl, C, C++, C#, Java, JavaScript, Python, Ruby, assembly language, Fortran, COBOL, SQL, PHP, XML, HTML, among others. The software code 202 may be received from a database, from a network, from a tangible computer-readable storage media including RAM, ROM, EEPROM, CD-ROM or other optical disk storage, magnetic disk storage or other magnetic storage devices, or any other storage medium which may be used to carry or store desired program code in the form of computer-executable instructions or data structures and which may be accessed by a general purpose or special purpose computer, or from some other location.

The code parser 220 may be configured to parse the software code 202 by analyzing the software code 202. In particular, the code parser 220 may be configured to analyze the syntax of the software code 202 and to generate parsed software code 222 that may be sent to the flow graph generator 230. The parsed software code 222 may be in the form of a syntax tree or other software code representation that is more basic or lower than the software code 202.

The flow graph generator 230 may be configured to generate a flow graph 232 based on the parsed software code 222. The flow graph 232, in some embodiments, may be analogous to the flow graph 100A of FIG. 1A. In some embodiments, the flow graph 232 may be a control flow graph that includes various nodes and edges. The nodes of the flow graph 232 may correspond to different operations or blocks of operations within the software code 202. The edges within the flow graph 232 may represent flow between the nodes within the software code 202. As a result, the flow graph 232 may be configured to represent some or all of the different execution paths that may occur during execution of the software code 202. The different executions paths of the software code 202 may be determined to generate the flow graph 232 using static analysis of the parsed software code 222.

In some embodiments, generating the flow graph 232 may involve generating a lower-level code of the parsed software code 222. For example, the parsed software code 222 may be analyzed and higher-level instructions within the parsed software code 222 may be deconstructed into multiple lower-level instructions that perform the same function. The lower-level code may be optimized to remove redundancies among other things. The optimized lower-level code may be used to generate the flow graph 232. For example, when the parsed software code 222 is JavaScript, the parsed software code 222 may be desugared to generate a lambda-JS model. The lambda-JS model may then be converted into a continuation-passing style model (CPS). The CPS model may be optimized and used to generate the flow graph 232.

Numerous other methods, procedures, steps, and operations may be performed by the flow graph generator 230 to generate the flow graph 232, all of which may be performed without departing from the scope of the present disclosure. After being generated, the flow graph 232 may be sent to the flow graph analyzer 240 and the contracted flow graph generator 250.

The flow graph analyzer 240 may be configured to analyze the flow graph 232 based on metric information 204 received by the system 200 and/or other parameters to identify termination nodes 242, metric nodes 244, and entry nodes 246 within the flow graph 232. The metric information 204 may be information related to a metric being determined for the system 200. For example, when the metric that may be determined for the software code 202 relates to security, the metric information 204 may include information about sensitive functions, methods, or objects related to security of the software code 202.

The termination nodes 242 may each include a corresponding termination operation within the software code 202. A termination operation may be any operation in the software code 202 that terminates, ends, suspends, or otherwise stops the execution of the software code 202 until the software code 202 is reset or executing again. For example, a termination operation may include a thrown exception, end of code, among other termination or exit points. In some embodiments, the termination operation may be specific to the metric being determined for the software code 202 and thus the metric information 204 received by the system 200. For example, when the metric information 204 relates to disk-access, the termination operation may be an operation in the software code 202 that terminates disk access.

The metric nodes 244 may each include a corresponding metric object as indicated by the metric information 204 received by the system 200. A metric object may be any object in the software code 202, such as a variable, function, method, or operation. The metric object may be selected based on the metric information 204 received by the system 200. For example, when the metric information 204 relates to security of the software code 202, the metric object may be an operation associated with user permissions, accesses to a database, writing to a disk, protected information, among others. As another example, when the metric information 204 relates to compute time, the metric object may be an operation that uses multiple computations or is computationally intensive, such as a function to determine prime numbers or compute on large numbers of large objects.

The entry nodes 246 may each include a corresponding entry operation within the software code 202. An entry operation may be any operation in the software code 202 that allows a person or an outside system to interact with the software code 202. Interactions with the software code 202 may include receiving data, sending data, and/or displaying data using a user interface, an API interface, or some other interface. In some embodiments, the entry operation may be specific to a metric being determined for the software code 202. For example, when the metric relates to network-access, the entry operation may be an operation in the software code 202 that begins network access.

In some embodiments, the entry operations, termination operations, and/or metric objects may be identified in the software code 202 based on the metric information 204 before the software code 202 is parsed by the code parser 220. In these and other embodiments, locations within the software code 202 that include the entry operations, termination operations, and/or metric objects may be marked. In some embodiments, the software code 202 may be marked by a user. The flow graph 232 constructed based on the software code 202 may include the marks within the nodes that include the entry operations, termination operations, and/or metric objects, such as the entry nodes 246, the termination nodes 242, and/or the metric nodes 244, respectively. The flow graph analyzer 240 may analyze the flow graph 232 to identify the marks within the flow graph 232 and thereby identify the entry nodes 246, the termination nodes 242, and/or the metric nodes 244. The identified entry nodes 246, termination nodes 242, and metric nodes 244 may be sent to the path counter 260.

The contracted flow graph generator 250 may be configured to generate a contracted flow graph 252 that includes multiple contracted flow graph nodes based on the flow graph 232. To generate the contracted flow graph 252, the contracted flow graph generator 250 may analyze the flow graph 232 to determine subsets of nodes within the flow graph 232 that are strongly connected. A subset of nodes may be strongly connected when there is a path from each node in the subset to every other node in the subset. The contracted flow graph generator 250 may be configured to cluster each subset of nodes that are strongly connected into a cluster contracted flow graph node. After clustering each subset of nodes that are strongly connected into cluster contracted flow graph nodes, nodes of the flow graph 232 that are not strongly connected to other nodes in the flow graph 232 become contracted flow graph nodes in the contracted flow graph 252 and the contract glow graph nodes and the cluster contracted flow graph nodes are connected to form the contracted flow graph 252.

In some embodiments, the contracted flow graph generator 250 may cluster one or more subsets of nodes that are strongly connected into cluster contracted flow graph nodes. Alternately or additionally, the contracted flow graph generator 250 may cluster each of the subsets of nodes that are strongly connected into a cluster contracted flow graph node. In these and other embodiments, the contracted flow graph 252 may be a direct acyclic graph or other suitable graph. In some embodiments, the contracted flow graph generator 250 may cluster a subset of nodes from the flow graph 232 into a cluster contracted flow graph node based on criteria other than the subset of nodes being strongly connected. The contracted flow graph 252 may be sent to the path counter 260.

The path counter 260 may include a through path counter 262, a metric entry path counter 264, and a metric termination path counter 266. The through path counter 262 may be configured to determine a number of through paths between each of or some of the pairs of the termination nodes 242 and entry nodes 246 based on the contracted flow graph 252. For example, when there are first and second termination nodes 242 and first and second entry nodes 246, the through path counter 262 may determine a number of through paths between the first termination node and the first entry node, the first termination node and the second entry node, the second termination node and the first entry node, and the second termination node and the second entry node.

To determine the through paths between the pairs of the termination nodes 242 and the entry nodes 246, the through path counter 262 may determine the contracted flow graph node(s) that correspond to or include the termination nodes 242 and the entry nodes 246. For example, in some embodiments, some of the entry nodes 246 or termination nodes 242 may be included in a cluster contracted flow graph node. Based on the contracted flow graph nodes that correspond to or include the termination nodes 242 and the entry nodes 246, the through path counter 262 may determine the number of paths between each of or some of the pairs of the termination nodes 242 and the entry nodes 246. A path may be considered different when the path includes different contracted flow graph nodes and/or a different sequence of contracted flow graph nodes.

In some embodiments, each cluster contracted flow graph node that includes a subset of flow graph nodes may have a weighted path value as explained with respect to FIG. 1B. As a result, a single path through the contracted flow graph 252 between two contracted flow graph nodes may be counted as multiple paths by the through path counter 262 when the single path passes through a cluster contracted flow graph node with a weighted path value. For example, assume that a cluster contracted flow graph node has a weighted path value of 10. A path that includes the cluster contracted flow graph node with the weighted path value of 10 may be counted as 10 paths by the through path counter 262. The through path counter 262 may be configured to combine the number of through paths determined between each of or some of the pairs of the entry nodes 246 and the termination nodes 242 and output the combined number as the through path count 270.

The metric entry path counter 264 may be configured to determine a number of metric entry paths between each of or some of the pairs of the metric nodes 244 and the entry nodes 246 based on the contracted flow graph 252. The metric entry path counter 264 may be configured to combine the number of metric entry paths determined between each of or some of the pairs of the entry nodes 246 and the metric nodes 244 and output the combined number as the metric entry path count 272. The metric entry path counter 264 may function in an analogous manner as the through path counter 262.

The metric termination path counter 266 may be configured to determine a number of terminations paths between each of or some of the pairs of the metric nodes 244 and the termination nodes 242 based on the contracted flow graph 252. The metric termination path counter 266 may be configured to combine the number of metric termination paths determined between each of or some of the pairs of the termination nodes 242 and the metric nodes 244 and output the combined number as the metric termination path count 274. The metric termination path counter 266 may function in an analogous manner as the through path counter 262.

Comparisons between the through path count 270, the metric entry path count 272, and the metric termination path count 274 may be used to determine a metric for the software code 202. For example, the metric entry path count 272 and the through path count 270 for a metric node(s) of the software code 202 may be determined and compared to determine a first ratio, which may be a first metric of the software code 202. The software code 202 may undergo changes, such as code edits to increase functionality and/or fix issues with the software code 202. The metric entry path count 272 and the through path count 270 for the metric node(s) may be determined and compared after the changes to the software code 202 are effected to determine a second ratio, which may be a second metric of the software code 202. Differences between the first metric and the second metric as related to the metric node(s) may indicate unwanted, undesired, and/or unconsidered effects to the software code 202, and in particular the metric node(s), due to the changes, or alternatively may indicate improvements to the software code 202, and in particular the metric node(s), due to the changes. By determining the through path count 270, the metric entry path count 272, and/or the metric termination path count 274 for the software code 202, changes to the software code 202 with respect to the metric information 204 may be quantitatively tracked. Additionally, using metrics of the software code 202, the software code 202 may be quantitatively compared with different versions of the software code 202 and/or with other software code.

In some embodiments, the metric of the software code 202 may be based on a combination of ratios or other comparisons among the through path count 270, the metric entry path count 272, and/or the metric termination path count 274. Alternately or additionally, the metric of the software code 202 may be based on some mathematical formula that includes or is otherwise based on the through path count 270, the metric entry path count 272, and/or the metric termination path count 274.

Modifications, additions, or omissions may be made to the system 200 without departing from the scope of the present disclosure. For example, the system 200 may be configured to include a metric determination unit. The metric determination unit may be configured to determine a metric based on the through path count 270, the metric entry path count 272, and/or the metric termination path count 274. In some embodiments, certain aspects of the system 200 may be different depending on the programming language for the software code 202. For example, a parser used for parsing Java may be different than a parser used for parsing C. However, the fundamental principles described with respect to the system 200 remain the same regardless of the programming language used for the software code 202. In some embodiments, the system 200 may be implemented using computer-readable media for carrying or having computer-executable instructions or data structures stored thereon that implement the system 200.

Figure 3:
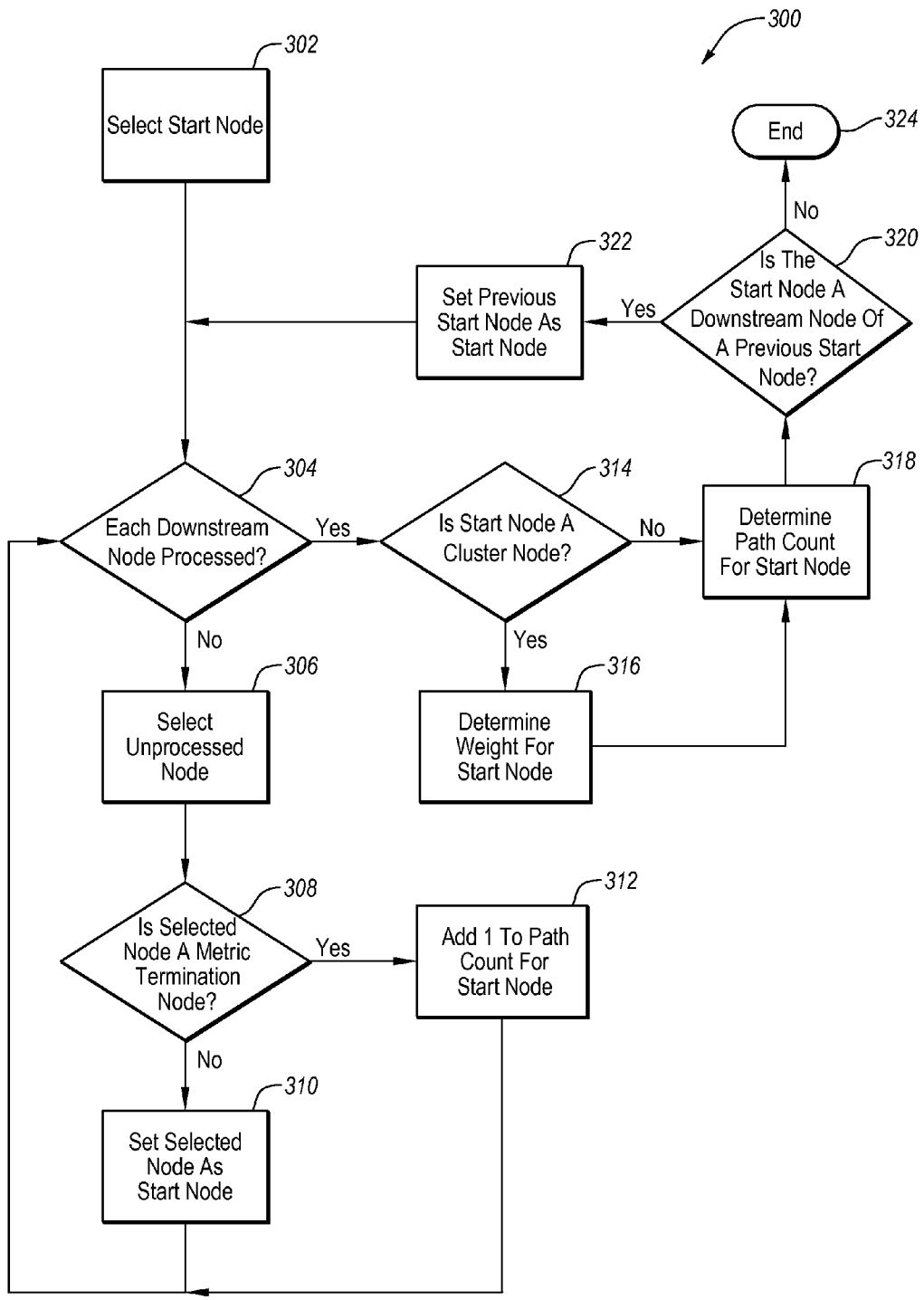
FIG. 3 illustrates an example method of determining paths counts.

FIG. 3 is a flow chart of an example method 300 of determining paths counts, arranged in accordance with at least some embodiments described herein. The method 300 may be implemented, in some embodiments, by a system, such as the system 200 of FIG. 2. In particular, the method 300 may be implemented by the path counter 260 of FIG. 2. For example, the method 300 may be implemented by the through path counter 262, the metric entry path counter 264, and/or the metric termination path counter 266 of FIG. 2 Although illustrated as discrete blocks, various blocks may be divided into additional blocks, combined into fewer blocks, or eliminated, depending on the desired implementation.

As illustrated, the method 300 implements a recursive type method for determining path counts between nodes in a contracted flow graph. As a result, the method 300 may proceed through various blocks illustrated in FIG. 3 multiple times before the method 300 ends in block 324. Alternately or additional, multiple different nodes within the contracted flow graph may be identified as a start node as described herein during the method 300.

The method 300 may begin at block 302, where a start node may be selected. The start node may be any one of numerous contracted flow graph nodes in the contracted flow graph. The contracted flow graph may be based on a flow graph and may have contracted flow graph nodes that are cluster contracted flow graph nodes. For example, the contracted flow graph may be analogous to the contracted flow graph 100B of FIG. 1B. In some embodiments, the start node may be an entry node or a cluster contracted flow graph node that includes an entry node. Alternately or additionally, the start node may be a metric node or a cluster contracted flow graph node that includes a metric node.

In block 304, it may be determined if each node downstream of the start node has been processed by the method 300. A node may be downstream of another node when the node is after the another node in an execution path of the software code represented by the contracted flow graph. For example, in FIG. 1B, for the cluster contracted flow graph node 140B, the cluster contracted flow graph node 140C and the contracted flow graph node 142 are downstream from the cluster contracted flow graph node 140B while the cluster contracted flow graph node 140A is upstream of the cluster contracted flow graph node 140B. A node may be considered to be processed when the node has been selected in block 306. When a downstream node of the start node has not been processed, the method 300 may proceed to block 306. When all of the downstream nodes of the start node have been processed, the method 300 may proceed to block 314.

In block 306, an unprocessed downstream node may be selected. In block 308, it may be determined if the selected unprocessed downstream node includes or is a metric termination node. When the selected unprocessed downstream node includes or is a metric termination node, the method 300 may proceed to block 312. When selected unprocessed downstream node does not include or is not a metric termination node, the method 300 may proceed to block 310. In block 310, the selected unprocessed downstream node may be set as the start node and the method 300 may proceed to block 304.

In block 312, the path count for the start node may be increased by one and the method 300 may proceed to block 304. As previously indicated, in block 304, when all of the downstream nodes of the start node have been processed, the method 300 may proceed to block 314.

In block 314, it may be determined if the start node is a cluster contracted flow graph node in the contracted flow graph. When the start node is a cluster contracted flow graph node in the contracted flow graph, the method 300 may proceed to block 316. When the start node is not a cluster contracted flow graph node in the contracted flow graph, the method 300 may proceed to block 318.

In block 316, a weighted path value associated with the start node may be determined. The weighted path value may be determined, in some embodiments, based on the number of flow graph nodes clustered in the start node and/or the configuration of the flow graph nodes clustered in the start node. The weighted path value may also be determined based on any other method discussed herein.

In block 318, the path count for the start node may be determined. The path count may be determined based on the path counts added during block 312 or from path counts determined previously for start nodes that are downstream from the start node. In some embodiments, when the start node is a cluster contracted flow graph node, the determined path count may be multiplied by the weighted path value of the start node.

In block 320, it may be determined if the start node is a downstream node of a previous start node. When the start node is not a downstream node of a previous start node, that is when the start node was the initial start node selected in block 302, the method 300 may proceed to block 324. When the start node is a downstream node of a previous start node, the method 300 may proceed to block 322.

In block 322, the previous start node may be set as the start node and the method may proceed to block 304. The previous start node that is set as the start node may be the node that was most recently selected as a start node before the current start node for which the path count is determined in block 318. In block 324, the method 300 may end.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Furthermore, the method 300 is only one example of a method that may be used to determine path counts within a contracted flow chart. Other methods for determining path counts may be used without departing from the scope of the present disclosure.

Figure 4:
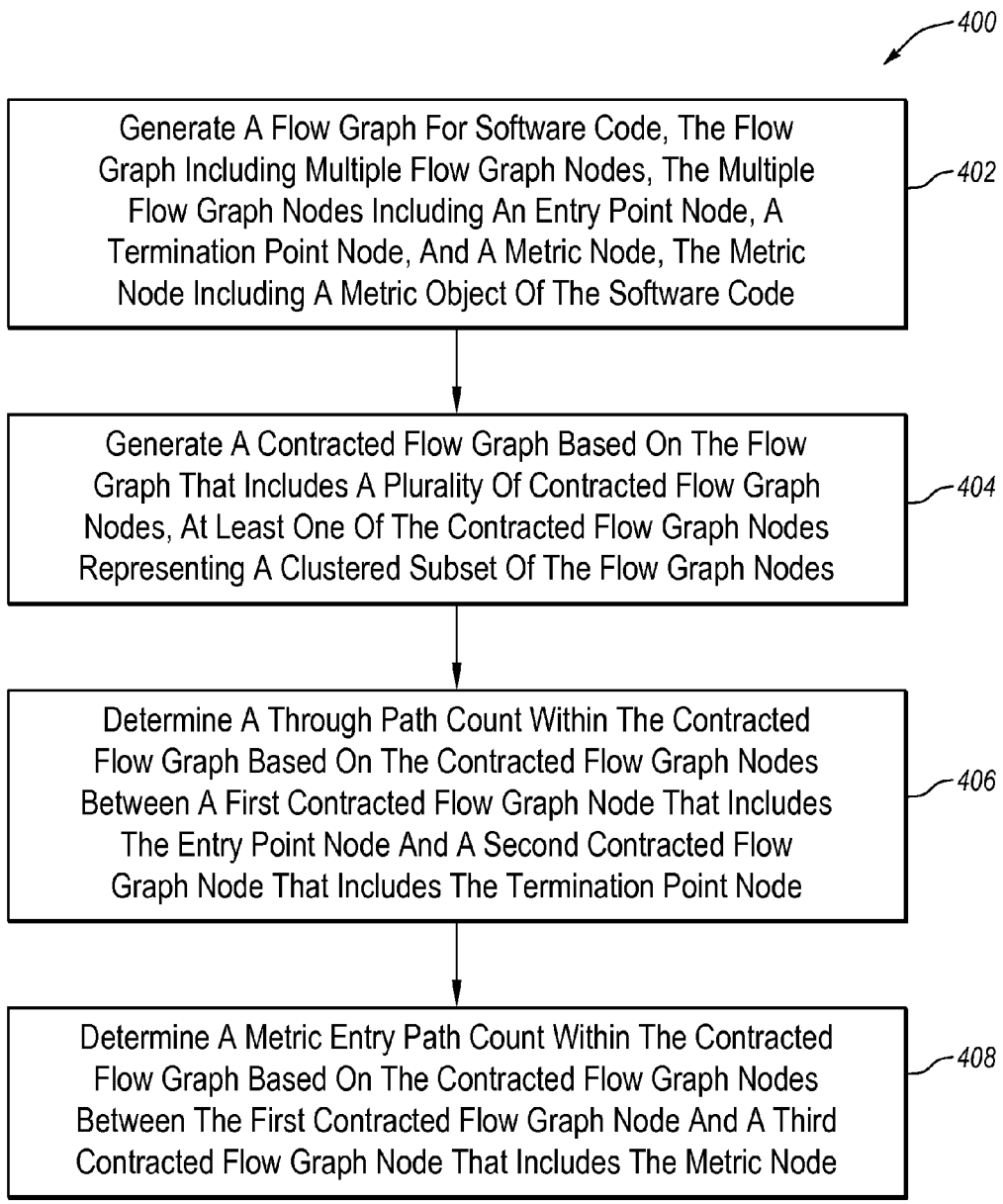
FIG. 4 illustrates an example method of determining a metric of software code.

FIG. 4 is a flow chart of an example method 400 of determining a metric of software code, arranged in accordance with at least some embodiments described herein. The method 400 may be implemented, in some embodiments, by a system, such as the system 200 of FIG. 2. Although illustrated as discrete blocks, various blocks may be divided into additional blocks, combined into fewer blocks, or eliminated, depending on the desired implementation.

The method 400 may begin at block 402, where a flow graph may be generated for software code. The flow graph may include multiple flow graph nodes. The multiple flow graph nodes may include an entry point node, a termination point node, and a metric node. The metric node may include a metric object of the software code. In some embodiments, the flow graph may be generated based on static analysis of the software code.

In block 404, a contracted flow graph may be generated based on the flow graph that includes multiple contracted flow graph nodes. At least one of the contracted flow graph nodes may represent a clustered subset of the flow graph nodes.

In block 406, a through path count may be determined within the contracted flow graph based on the contracted flow graph nodes between a first contracted flow graph node that includes the entry point node and a second contracted flow graph node that includes the termination point node.

In block 408, a metric entry path count within the contracted flow graph may be determined based on the contracted flow graph nodes between the first contracted flow graph node and a third contracted flow graph node that includes the metric node. In some embodiments, one of the contracted flow graph nodes between the first contracted flow graph node and the third contracted flow graph node may be the at least one of the contracted flow graph nodes that represents the clustered subset of the flow graph nodes. In these and other embodiments, the metric entry path count may be increased by a weighted path value associated with the at least one of the contracted flow graph nodes. In some embodiments, the weighted path value may be based on a number of flow graph nodes within the clustered subset of the flow graph nodes.

The method 400 may further include determining a metric of the software code based on a ratio of the through path count and the metric entry path count. In these and other embodiments, the metric object of the software code may be identified based on the metric of the software code being determined.

The method 400 may further include determining a metric termination path count within the contracted flow graph based on the contracted flow graph nodes between the third contracted flow graph node and the second contacted flow graph node. In these and other embodiments, the metric of the software code may be further based on a second ratio of the through path count and the metric termination path count. In some embodiments, the metric of the software code may relate to security of the software code, network performance of the software code, disk access performance of the software code, user interactions with the software code, among other aspects of the software code.

The foregoing detailed description has set forth various embodiments via the use of block diagrams, flowcharts, and/or examples, such as the block diagram that illustrates the system 200 of FIG. 2 and the flow chart that illustrates the method 400 of FIG. 4. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to carry out the distribution Furthermore, the embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may comprise tangible computer-readable storage media including RAM, ROM, EEPROM, CD-ROM or other optical disk storage, magnetic disk storage or other magnetic storage devices, or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions comprise, for example, instructions and data, which cause a general-purpose computer, special purpose computer, or special purpose-processing device (e.g. a processor) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method of determining a metric of software code, the method comprising:
  generating, using a computer system, a flow graph for software code, the flow graph including a plurality of flow graph nodes, the plurality of flow graph nodes including an entry point node, a termination point node, and a metric node, the metric node including a metric object of the software code;
  generating a contracted flow graph based on the flow graph that includes a plurality of contracted flow graph nodes, at least one of the contracted flow graph nodes representing a clustered subset of the flow graph nodes;
  determining a through path count within the contracted flow graph based on the contracted flow graph nodes between a first contracted flow graph node that includes the entry point node and a second contracted flow graph node that includes the termination point node by counting a number of different execution paths in the contracted flow graph between the first and second contracted flow graph nodes; and determining a metric entry path count within the contracted flow graph based on the contracted flow graph nodes between the first contracted flow graph node and a third contracted flow graph node that includes the metric node by counting a number of different execution paths in the contracted flow graph between the first and third contracted flow graph nodes.

2. The method of claim 1, further comprising determining a metric of the software code based on a ratio of the through path count and the metric entry path count.

3. The method of claim 2, wherein the metric object of the software code is identified based on the metric being determined.

4. The method of claim 2, further comprising determining a metric termination path count within the contracted flow graph based on the contracted flow graph nodes between the third contracted flow graph node and the second contacted flow graph node.

5. The method of claim 4, wherein the metric is further based on a second ratio of the through path count and the metric termination path count.

6. The method of claim 2, wherein the metric relates to security of the software code, network performance of the software code, disk access performance of the software code, or user interactions with the software code.

7. The method of claim 1, wherein the contracted flow graph is a directed acyclic graph.

8. The method of claim 1, wherein the flow graph is generated based on static analysis of the software code.

9. The method of claim 1, wherein one of the contracted flow graph nodes between the first contracted flow graph node and the third contracted flow graph node is the at least one of the contracted flow graph nodes that represents the clustered subset of the flow graph nodes, wherein the metric entry path count is increased by a weighted path value associated with the at least one of the contracted flow graph nodes.

10. The method of claim 9, wherein the weighted path value is based on a number of flow graph nodes within the clustered subset of the flow graph nodes.

11. A non-transitory computer readable medium that includes computer readable instructions that when executed by one or more processors perform operations for determining a metric of software code, the operations comprising:

generating a flow graph for software code, the flow graph including a plurality of flow graph nodes, the plurality of flow graph nodes including an entry point node, a termination point node, and a metric node, the metric node including a metric object of the software code;

generating a contracted flow graph based on the flow graph that includes a plurality of contracted flow graph nodes, at least one of the contracted flow graph nodes representing a clustered subset of the flow graph nodes;

determining a through path count within the contracted flow graph based on the contracted flow graph nodes between a first contracted flow graph node that includes the entry point node and a second contracted flow graph node that includes the termination point node by counting a number of different execution paths in the contracted flow graph between the first and second contracted flow graph nodes; and determining a metric entry path count within the contracted flow graph based on the contracted flow graph nodes between the first contracted flow graph node and a third contracted flow graph node that includes the metric node by counting a number of different execution paths in the contracted flow graph between the first and third contracted flow graph nodes.

12. The non-transitory computer readable medium of claim 11, the operations further comprising determining a metric of the software code based on a ratio of the through path count and the metric entry path count.

13. The non-transitory computer readable medium of claim 12, wherein the metric object of the software code is identified based on the metric being determined.

14. The non-transitory computer readable medium of claim 12, the operations further comprising determining a metric termination path count within the contracted flow graph based on the contracted flow graph nodes between the third contracted flow graph node and the second contacted flow graph node.

15. The non-transitory computer readable medium of claim 14, wherein the metric is further based on a second ratio of the through path count and the metric termination path count.

16. The non-transitory computer readable medium of claim 12, wherein the metric relates to security of the software code, network performance of the software code, disk access performance of the software code, or user interactions with the software code.

17. The non-transitory computer readable medium of claim 11, wherein the contracted flow graph is a directed acyclic graph.

18. The non-transitory computer readable medium of claim 11, wherein the flow graph is generated based on static analysis of the software code.

19. The non-transitory computer readable medium of claim 11, wherein one of the contracted flow graph nodes between the first contracted flow graph node and the third contracted flow graph node is the at least one of the contracted flow graph nodes that represents the clustered subset of the flow graph nodes, wherein the metric entry path count is increased by a weighted path value associated with the at least one of the contracted flow graph nodes.

20. The non-transitory computer readable medium of claim 19, wherein the weighted path value is based on a number of flow graph nodes within the clustered subset of the flow graph nodes.

* * * * *